United States Patent
Squillace

(10) Patent No.: US 7,184,658 B2
(45) Date of Patent: Feb. 27, 2007

(54) AUTOMATIC FLASH SWITCHING ROTATIONAL STROBE FRAME

(75) Inventor: John Squillace, Burbank, CA (US)

(73) Assignee: Squillace Production Studios, LLC, Burbank, CA (US)

( * ) Notice: Subject to any disclaimer, the term of this patent is extended or adjusted under 35 U.S.C. 154(b) by 305 days.

(21) Appl. No.: 10/904,274

(22) Filed: Nov. 2, 2004

(65) Prior Publication Data

US 2006/0093348 A1 May 4, 2006

(51) Int. Cl.
*G03B 15/03* (2006.01)
*G03B 17/00* (2006.01)

(52) U.S. Cl. .............. 396/160; 396/190; 396/198; 396/422; 362/13

(58) Field of Classification Search ........... 396/155, 396/160, 422, 189, 190, 198, 182
See application file for complete search history.

(56) References Cited

U.S. PATENT DOCUMENTS

| | | | | |
|---|---|---|---|---|
| 4,359,275 A | | 11/1982 | Hasegawa | 354/33 |
| 4,449,802 A | * | 5/1984 | Nakamura | 396/159 |
| 4,457,602 A | | 7/1984 | Mizokami | 396/161 |
| 4,754,295 A | | 6/1988 | Scott | 354/129 |
| 4,870,438 A | * | 9/1989 | Taniguchi et al. | 396/159 |
| 4,920,371 A | * | 4/1990 | Kaneko | 396/189 |
| 5,051,763 A | | 9/1991 | Yukevich, Jr. | 354/132 |
| 5,299,012 A | | 3/1994 | Tsuruta et al. | 348/370 |
| 5,305,045 A | * | 4/1994 | Terada | 396/61 |
| 5,570,148 A | | 10/1996 | Hibino | 396/182 |

(Continued)

FOREIGN PATENT DOCUMENTS

DE 3346757 A * 7/1985

*Primary Examiner*—Christopher Mahoney
(74) *Attorney, Agent, or Firm*—Law Offices of Ken Dallara; Ken Dallara

(57) ABSTRACT

In the realm of professional photography, and those amateur wanting professional results, when photographing people, the illumination devices must be located directly above and on the centerline of the camera lens. This is the desired effect as not to have shadows behind the subjects. Changing from landscape to portrait modes, currently requires the re-adjustment of the illumination devices to bring them in line with the camera. In photographing people, the instant does not wait for the photographer to ready his equipment, rather the photographer must be able to adapt quickly. There exists many different kinds illumination devices that are necessary for proper illumination of photographic subjects, in particular people. There also exists cameras that utilize digital imaging technology that senses through the camera lens for exactitudes of distance and amount of ambient light. Even though the technology is vast, there is no camera that can sense it's planar projection and transfer that information to illumination devices, so that only those illuminating devices that will produce the most desired effects will operate along with the camera, while those other devices that are not needed for the most desired effects will not operate. In this invention, there is not only a device that incorporates a multi-angular platform apparatus for the illumination devices, for the camera and for the through the lens data interface but it also incorporates the ability to rapidly change illumination device triggering based the planar orientations of the camera while maintaining proper illumination effects. In this invention, only those devices that will produce the desired photographic effects are triggered to operate, while those that will not produce the desired photographic effect will not operate. This invention is also transferable to all cameras that trigger illumination devices.

29 Claims, 5 Drawing Sheets

U.S. PATENT DOCUMENTS

| | | |
|---|---|---|
| 5,848,306 A | 12/1998 | Shono ........................ 396/198 |
| 6,075,947 A | 6/2000 | Tokunaga ................... 396/157 |
| 6,512,890 B2 | 1/2003 | Kawasaki ................... 396/157 |
| 6,654,558 B2 * | 11/2003 | Chen et al. .................. 396/182 |
| 6,778,764 B2 | 8/2004 | Barghini et al. .............. 396/28 |
| 2002/0168186 A1 * | 11/2002 | Jeudi .......................... 396/182 |

* cited by examiner

AUTOMATIC FLASH SWITCHING ROTATIONAL STROBE FRAME

BACKGROUND OF INVENTION

As technology increasingly advances in the development of cameras and camera devices, there is one issue that remains constant: What is the best method to illuminate the object to be photographed. There are many new photographic devices coming into the marketplace, which only adds to the myriad of devices already present in the marketplace. The only issue that all photographers can agree on is that illumination needs to be above the object to be photographed. Especially in the art of photography in relation to people, proper illumination is critical. Everyone remembers the old blue dot flashbulbs and "red-eye" from the 1970's. Illumination devices have progressed greatly, using pre-flashes to eliminate red-eye and the old blue dot flashbulbs, are replaced with high-powered intelligent flash devices. Cameras have progressed from instamatic to Digital Through the Lens or DTTL technology, where what the camera sees in terms of distance to object and amount of ambient light, are relayed to the many different illumination devices, where on-board computer chips calculate proper amount of illumination necessary based on the camera settings. As cameras can capture images through either portrait or landscape mode, devices have been made to bring the illuminating devices to be properly displayed above the camera lens. Photographing people, whether inside a studio or outside, demands rapid sequencing of photographs to be taken, while the subject often moves or adjusts themselves to highlight a particular feature. Cameras have been adjusted to accommodate these rapidly changing subjects with high-speed winders, lens and film. In studios, illumination is placed strategically to produce the intended effects, where outside of the studio, the photographer must bring their own illuminating devices, usually attached to the camera itself. Devices are made to hold devices at varying angles so that illumination is always available whether in the portrait or landscape mode. Japanese Application 2002-032044 to Junichi Et al filed on Aug. 2, 2002, discloses an invention that correlates the position of the flash to the position of the camera, and synchronizes a slave flash unit to the built-in flash unit of the camera. Unfortunately, this only correlates to lateral motion, in a single horizontal plane. Until now, there has been no device created that will allow for the proper illumination to be activated upon the camera demand, regardless of the camera's co-planar orientation, either portrait or landscape. Since the photographer only wants illumination from the top, currently the photographer has to either move the flash devices or manually turn off those devices that are not needed. This invention allows for immediate response to camera co-planar orientation, eliminating the need for manual adjustments. A photographer can continue to take pictures in either plane of orientation as quickly as the illumination devices allow to be processed. This is especially critical when photographing people at weddings, athletic events or even the paparazzi on the red carpet at movie premiers or the like.

The current state of the technology has evolved with the development of Through the Lens or TTL technology. Using the information gathered from sensors inside of the camera on the film plane or on the camera lens, illumination devices are fed analog information via direct connection to the camera through the camera's hotshoe or through synchronization cords or sync cords attached to remote devices. This process of Through the Lens data gathering is disclosed in U.S. Pat. No. 4,359,275 to Hasegawa issued on Nov. 16, 1982 and has become the standard interface for professional style cameras.

There are many patents relating to the technology of synchronizing the camera's action to the illumination devices. U.S. Pat. No. 5,848,306 to Shono, issued Dec. 8, 1998, describes a synchronization of the illumination devices or strobes to the camera's shutter action via the hotshoe of the camera. U.S. Pat. No. 5,570,148 to Hibino et al issued Oct. 29, 1996 describes synchronizing a flash device to the shutter speed set on the camera, through the use of information transferred through either the camera's hotshoe or sync cord attachment. U.S. Pat. No. 6,512,890 to Kawasaski et al issued Jan. 28, 2003 and U.S. Pat. No. 6,075,947 to Tokunaga issued Jun. 13, 2000, uses TTL information and then synchronizes multiple flash devices, designating some to emit pre-flashes to better determine how the remaining flash devices are to function. All of these patents stress the need for proper illumination of the subject matter, but only accomplish it in a single plane. Great effort and time are necessary to adjust the illumination to a camera's new planar orientation.

There is prior art which describes the switching of illumination devices to be either on or off. U.S. Pat. No. 5,299,012 to Tsuruta et al. issued Mar. 29, 1994, discloses a device that turns on the illumination device for a video camera, once the control circuit identifies current flow to the camera's motor circuit. U.S. Pat. No. 4,754,295 to Scott issued on Jun. 28, 1988 discloses the need to have two cameras on a mounting device with only one flash device. This patent discloses the need taking photographs in rapid succession where reloading time is not available as the subject of the photography would not still be present. This discloses the need for rapid photography but this manual switch does not allow for re-orientation of the flash device to match the camera planar orientation. There does not exist an automatic switch for camera's that senses the proper illumination angle to match the camera's planar orientation.

There are devices that are disclosed that hold illuminating devices along with a camera. Published Japanese Patent JP2004109770 discloses a multiple lamp photography system that realizes the proper exposure based on the photographic condition. U.S. Pat. No. 6,000,859 to Mulcahy et al. issued on Dec. 14, 1999, discloses a device for use by a person to orientate a camera in either a horizontal or vertical position while allowing the person to position the light source of the flash unit to be above the lens. This device is simply a holder for the flash attachments and the user is forced to manually attach and detach the sync cords from the flash units so that the flash above the lens is the flash that is being used. Other patents detail illuminating device holders, but fail to compensate for the planar orientation of the camera in an automatic mode. (U.S. Pat. No. 4,259,000 to Heredia issued Mar. 31, 1981, U.S. Pat. No. 4,752,794 to Bohannon issued Jun. 21, 1988) These patents would not be applicable to situations, herein described, where rapid succession of pictures need to be taken, without time to manually adjust for photographic camera planar orientation.

BRIEF SUMMARY OF INVENTION

It is the principle object of this invention to provide a means of sensing camera planar orientation and provide a means to designate which of multiple illumination devices are to be activated based upon the camera's planar orientation producing the required photographic quality necessitated by professional and amateur photographers. It is a further object of this invention to provide the aforementioned means to both single reflex, analog or digital, cameras as well as for the point-n-shoot style of camera. It is a further object of this invention to provide a camera holding apparatus that both aligns the illumination devices in the proper alignment with film plate or CCD digital chip and allows for both horizontal and vertical placement of illumination devices. It is a further object of this invention to provide a camera holding apparatus that is ergonomically adjustable to both a wide variety of camera styles and human hand dimensions. It is a further object of this invention to provide a camera holding apparatus that contains an integral lens protection device, protecting the lens from contact with a horizontal surface when apparatus is set down, and also protects lens settings from accidental contact and possible re-alignment when apparatus is used in crowded situations. It is a further object of this invention to accommodate usage of the apparatus while attached to a tripod or similar device.

To attain the above objects, there is provided a camera system which consists essentially of a camera holding apparatus, a multiple hot shoe connection modules, switching modules and associated synchronization cords. The camera holding apparatus consists essentially of an anti-twist bracket interface, various threaded throughholes, adjustable hand interlocking device, adjustable illumination attachment area, and lens protection device.

With the compilation of the aforementioned objects, the photographer is able to have two sets of illumination devices juxtapostionally held at 90 degree angles from one another. The first plane is in parallel alignment with the film or CCD Chip plane of the camera. The second plane is perpendicular to the film or CCD Chip plane of the camera, adjusted as to position the center of the illumination devices to be along the centerline of the lens of the camera. The camera holding apparatus is designed to adapt to many styles of cameras. Professional cameras, such as those that incorporate Multi-functional Power Portrait Grips, are the standard which incorporate digital Through the Lens or DTTL technology. The Analog Through the Len or ATTL technology style of cameras are also adapted for use with this apparatus, along with box style or 4×4 portrait cameras and the simple "point and shoot" amateur cameras. The common tripod interface is the 10-24 course threaded female docking hole, that is common amongst most cameras, and is the main attachment mode for this apparatus. The entire Automatic Flash Switching Rotational Strobe Frame is designed so that it can be worn using the existing camera strap or attached to a fixed object such as a tripod. This is not meant to limit the application of this invention to only those two mediums, as this device can be attached to any device used with photographic or video mediums. Changing the entrapped 10-24 course threaded male docking screw on the apparatus to varying other styles of docking hardware allows the apparatus to be used with any style of camera's docking methodology. The current invention is designed to utilize the Multi-function Power Portrait Grips common with professional style of Digital Through the Lens Cameras by placing the vertical illumination holding post to the right of the camera, though simply rotating the camera horizontally through 180 degrees will set the camera with illumination device on the left of the camera allowing for the photographer to place their hand in a supine position versus a pronated position when taking portrait oriented pictures. In the proposed pronated orientation, the entrapped 10-24 course threaded docking screw is slotably attached to the camera holding apparatus which allows the photographer to adjust the location of the camera so that the photographer's hand comfortably fits between the anterior portion of the vertical illumination holding post and the camera, thus allowing the photographer to rest the camera holding apparatus in the vertical position against the back of the photographer's hand. The anterior portion of the vertical illumination holding post is padded using a closed celled foam adhesively attached to the vertical illumination holding post. Any of various light porous semi-rigid spongy materials used for shock absorption can be used to accommodate various environmental or topical user reactions. The exterior portion of the vertical illumination holding post is where a switch module is slotably attached. The variable placement of the switch module corresponds to the centerline of the camera lens, positioning the centerline of the illumination device along the axis of the centerline of the camera lens. The camera holding apparatus is designed for both left and right sided flash orientation use with minimal adjustments of the lens protection device. The lens protection device is also located on the vertical illumination holding post. This lens protection device is made of a material similar to that material used on the camera holding apparatus. Any lightweight alloy can be used as material for the camera holding apparatus, preferably one that is able to be machinable such as aluminum, stainless steel or titanium. The current invention is using high-grade aircraft aluminum. The lens protection device is threadably attached to the vertical illumination post and can be rotateably relocated though its vertical plane to protect the camera lens should the camera be rotated so that the vertical illumination holding post is located on the left of the camera. The length of the lens protection device should be at least compensated to match the length of the lens of the camera, so that when the camera is placed upon a horizontal surface, such as a table, the camera's lens does not touch the horizontal surface, preventing damage to the lens. An supplemental benefit of the lens protection device is that the lens and the lens settings are also protected from contact and possible maladjustment during usage amongst many other photographers, such as on a red carpet of a movie premier, as many photographers are physically jostling for position for the best picture opportunity. The slight bend toward the camera lens located near the unattached end of the lens protection device is created to prevent accidental sharp contact of others during use. A female tripod attachment mounting hole is located on the open end of the camera holding apparatus, side opposite of the vertical illumination holding post. There are extra female 10-24 or ⅜-16 attachment holes located along the camera holding apparatus to accommodate additional devices or eyelets aiding the photographers in the use of the frame. It is possible to possible to create the camera holding device with vertical illumination holding posts on both lateral sides of the camera, inline with that film plate of the camera. This would allow for both supine and pronated styles of portrait photography at the same time.

Synchronization cords are provided to send analog or digital signals from the hotshoe of the camera to the illumination device which are on mounted directly onto the camera's hotshoe. In this invention, Digital Through the Lens cameras are used, detailing the need for 5 wire synchronization cords to be used, where other technologies, such as Analog Through the Lens camera's require less number of wires to be used. In the invention, Mini-XLR style male and female connectors are used to maintain connectivity between the switch modules. Pins in the connectors should be strong enough to withstand repeated connections while minimizing resistance. Connectors should include some kind of locking capabilities to prevent accidental dislodgment. The locking capability, which can include a protruding detent pin or a rotating locking ring which threadably attaches the connectors to the mating adaptor, increases the likelihood of good connectivity and minimizes the chance of disconnection, as the camera is rapidly switched between different planar regions. The wires should be stranded for flexibility, shielded to prevent interference with outside electrical influences, encapsulated in material such as to prevent environmental influences from affecting performance, and be of such composition as to maximize connectivity and minimize electrical resistance. In this invention, copper wire was used with gold plated connection pins encapsulated in a neoprene jacket, though other materials of similar composition and properties can be used.

The hot shoe connection module attaches to the camera's hotshoe. The hotshoe of the camera performs two functions. It provides a location directly on the center line of the camera to attach photographic devices, and it is the connection platform from the camera to the device, through which all of the Digital Through the Lens or Analog Through the Lens information and data is passed. There can be anywhere from 1 to 5 different nodes located in the hot show connection device, equally matching nodes from the hot shoe of the camera, in location and quantity. Each node passes one type of information or electrical impulses from the camera to the those device attached to the hotshoe. The nodes from the hot shoe of the camera and the nodes from the hot shoe connection device are held in contact through a locking means, providing a secure transfer of information. In this invention, the hot shoe connection module slides into the prescribed hot shoe of the camera and locks itself to the hotshoe of the camera. This locking means can be a cam-lock or a threaded locking ring device, both are common to photographic device common in use today. Any secure locking mechanism can be used, so long as it does not interfere with the function of the hotshoe of the camera. In this invention, the hotshoe connection module has 5 nodes which correspond to the 5 nodes on the hot shoe of a digital through the lens camera. Other hotshoe connection modules can be developed for other camera's with varying number or location of nodes. There are two styles of hot shoe connection modules used in this invention, one hot shoe connection module is a dual hot shoe connection module as it has two outputs and the single hot connection module only has one connection. The style of the connections will be similar to those on the synchronization cord but will have the opposite mating structure from that of the synchronization cord. In this invention, the synchronization cord has female pins and the hotshoe connection module has male pin receptors. The dual hot shoe connection module contains the wiring harness, switch module and wiring crossover, while the single hot shoe connection module only contains the switch module and a wiring connection. The wiring harness is the medium that connects the dual hot shoe connection module to the switch module. The wiring crossover splits the information from the camera's hotshoe into three separate information pathways, one to each of the switch modules. This allows for multiple illumination devices to be attached to the switch modules to gather information from the through the lens technology of the camera.

The switch module contains an equal number of orientation sensitive switches as there are nodes on the camera's hotshoe. In this invention, 5 mercury switches are present, positioned to be aligned with the vertical axis of the illumination device. These switches sense which illumination device is to receive the information from the camera so that the proper illumination device functions when the camera functions. It is those switches that are in the vertical orientation that allows data flow into the illumination device. Those devices in a horizontal plane are prohibited from receiving such data flow and thus do not function when the camera functions. These particular switches operate within approximately 20 degrees of vertical, not allowing for any range through the vertical planar motion where both devices are receiving data. Since the illumination devices are receiving their data directly from the camera, it is possible to perform a rapid sequence of photographs, varying between portrait and landscape modes, at varying distances and light angles. The upper portion of the switch module contains a female hot shoe connection, similar to the connection to which the lower portion of the hot shoe connection module attaches. The upper portion of the hot shoe connection module serves as the attachment point for the illumination device. This upper portion of the switch module can be adapted to accept a wide range of illumination devices, on only those that attach directly to a camera's hot shoe. Each illumination device functions separately upon the receipt of data from the camera. It is obvious to those skilled in the art of photography, that if one wishes to have the two illumination devices to function as the camera functions, through any myriad of angles, then one must only use an orientation sensitive switch with a greater range of contact, or one must orient the switch modules at varying degrees of offset from the vertical plane. It is also obvious to anyone skilled in the electrical arts that the use of mercury switches can be substituted by a myriad of different technologies and any use of devices that sense planar orientation and can translate that information to other device can be used and are within the spirit of this invention. It is also obvious to those skilled in the art, that this technology can be transferred to any style of camera, regardless of hot shoe connectivity. If there is not a hot shoe available, such is on the simple point and shoot disposable cameras or simple Single Lens Reflex cameras, it is possible to integrate the switch module itself, only using a common interface circuit between the shutter release button and the flash unit through cabling or the like, for gathering data as to when the shutter is operating for the illumination device to operate at the same time.

DETAILED DESCRIPTION OF DRAWINGS

Figure 1:
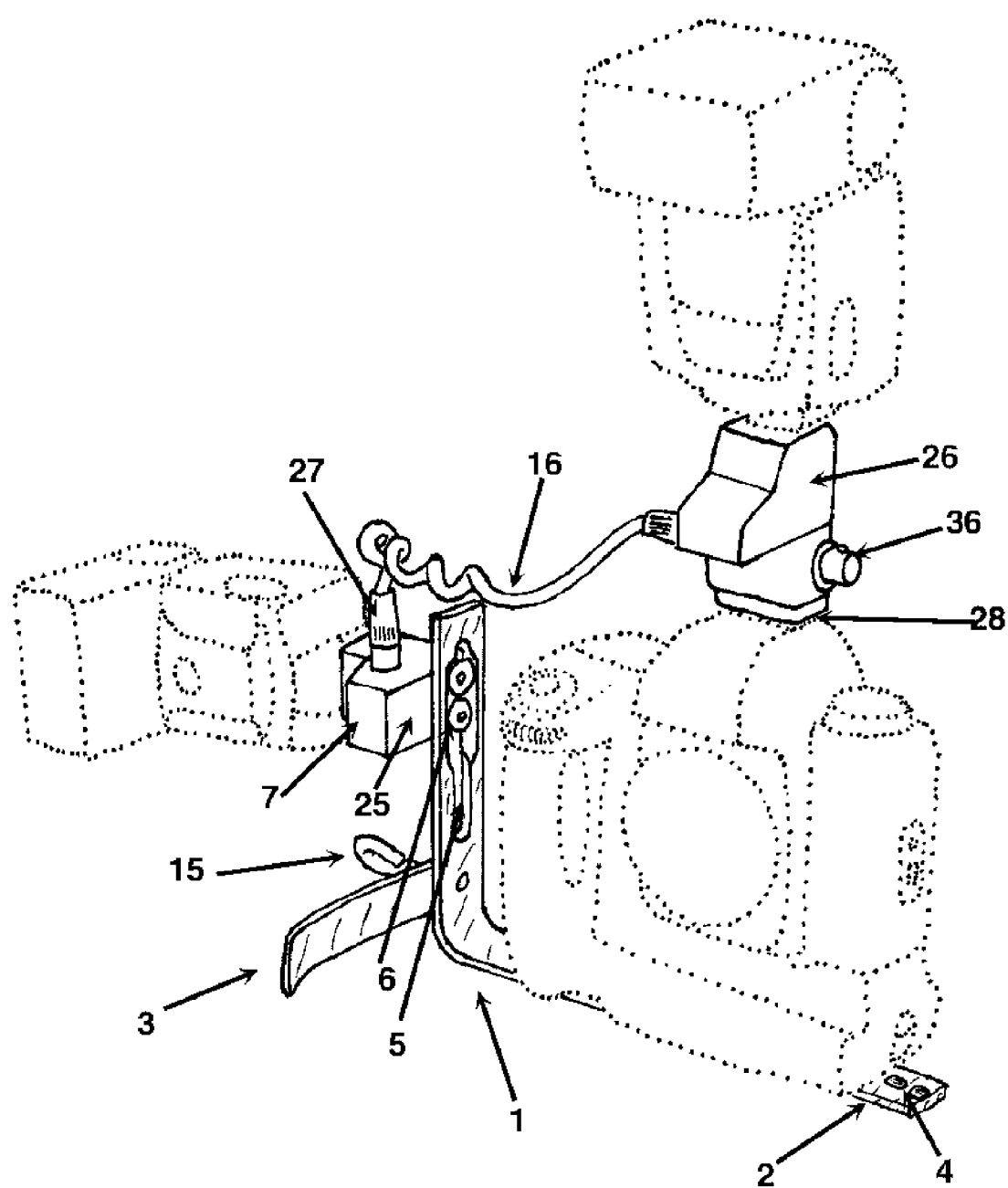
FIG. 1 shows the Frame with camera and illumination devices and lens protection device attached.
Figure 5:
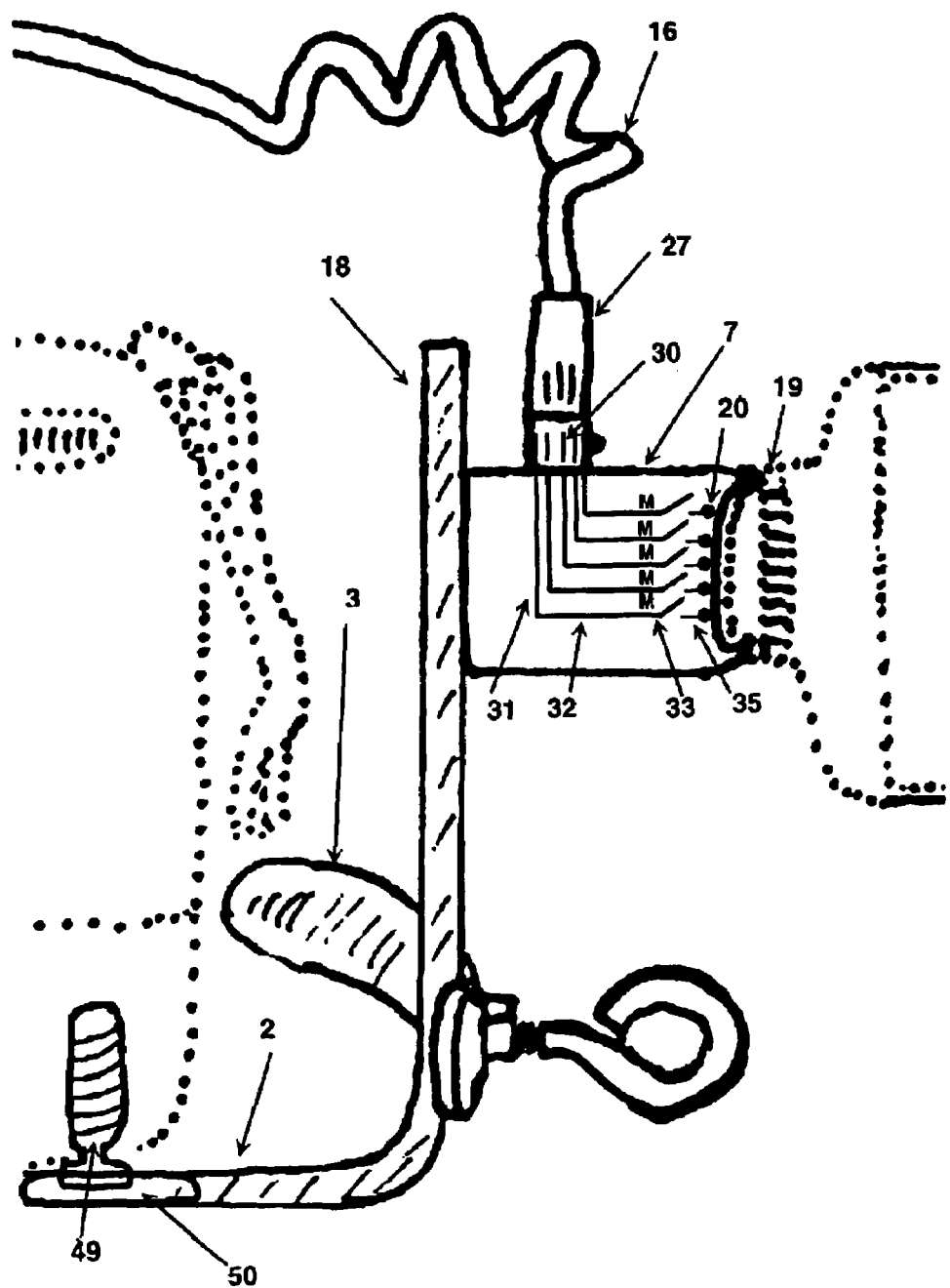
FIG. 5 shows an electrical schematic of the system for 2nd switching unit

As can be seen in FIG. 1, the type of camera is not critical to this apparatus the only requirement is that the camera have an attachment mount that will accept a stud thereinto, so that that camera can be secured onto the apparatus. Normally, the attachment mount is a female 10-24 threaded aperture which will accept a similarly threaded male stud. This is commonly referred to as a tripod or stand mount. The Automatic Flash Switching Rotational Strobe Frame consists of two main components, one is the mechanical frame and the other is the electronic switching means. The mechanical frame 1, is of singular piece construction made of a material with sufficient rigidity to withstand the weight of the camera and the attached illumination devices, but is also does not weigh more than is comfortable for the user to manipulate. In this invention, lightweight aircraft grade aluminum is used, but reinforced plastics are also suggested. Mechanical frame 1, consists of two segments, that are contiguous or formed from one single piece; a horizontal member 2, and at least 1 vertical mounting portion 18. The vertical mounting portion 18 is located directly perpendicular to horizontal member 2 and in the same plane as horizontal member 2. It is critical that the centerline of horizontal member 2 be the centerline of vertical mounting portion 18. Vertical mounting portion 18 can be positioned onto the left or right side or horizontal member 2, so as to adjust to the users preference. Another embodiment of this invention has at least 2 vertical mounting portion 18, perpendicularly located at opposite extreme ends of the horizontal member 2, providing additional mounting locations for illumination devices. There is no physical limitation as to the number of vertical mounting portion members so long as they are located such that the centerline of vertical mounting portion and the horizontal member are equivalent. Horizontal member 2 has, located at the end opposite of the vertical mounting portion 18, a series of mounting holes 4 where at least one throughhole is created. The series of holes should extend no greater than the profile of the camera to be mounted onto the horizontal member 2 so as not to interfere with the mounting of the camera. Mounting holes 4 are configured to adapt to tripod or other photographic devices available in the industry. In this invention, 10-24 threaded holes are used as that is a common thread size for tripod mounts. FIG. 5 shows horizontal member 2 also contains slot 50 through with a captive male docking stud 49 is contain therein. Captive male docking stud 49 is constructed so that it will interface with the camera's tripod mounting attachment or an anti-twist bracket attached to the camera's body. In this invention, a 10-24 threaded stud is used as that is the common tripod attachment device used in the photographic industry, but this does not preclude the use of quik-coupling or other such connection devices.

Vertical mounting portion 18 contains connecting means 22 for attaching camera lens protections means 3, preferably the connecting means 22 consists of a threaded adaptor capable of receiving a male threaded stud 23. Another embodiment has the male threaded stud to be in the configuration of an eyelet, shown as eyelet 15, which can receive a security clasp, which secures the frame to the user via a lanyard or other attachment means. An embodiment of this invention is the inclusion of hand cushion 34 which is attached to the interior portion of vertical mounting portion 18. This serves two purposes; One adds comfort for the back of the users hand, as the thickness of this hand cushion 34 can be adjusted to the individual user, and secondly, it protects the user from the discomfort of contact with the connecting means 22. In this invention, Teflon foam padding approximately 0.125 inch thick was used, but many other means are available. Another configuration of connecting means 22 consists of quick disconnect devices, common in use in the photographic industry. Camera Lens protection means 3 has a length that exceed the length of lens used by the camera by at least 2 times the dimension of the camera lens. One end of the camera lens protection means 3 is attached to the vertical mounting portion 18, using connection means 22. The opposite end of camera lens protection means 3 is possesses radiused corners and the end is radially configured as to not present itself as a device that will injury others due to its shape and length.

Figure 3:
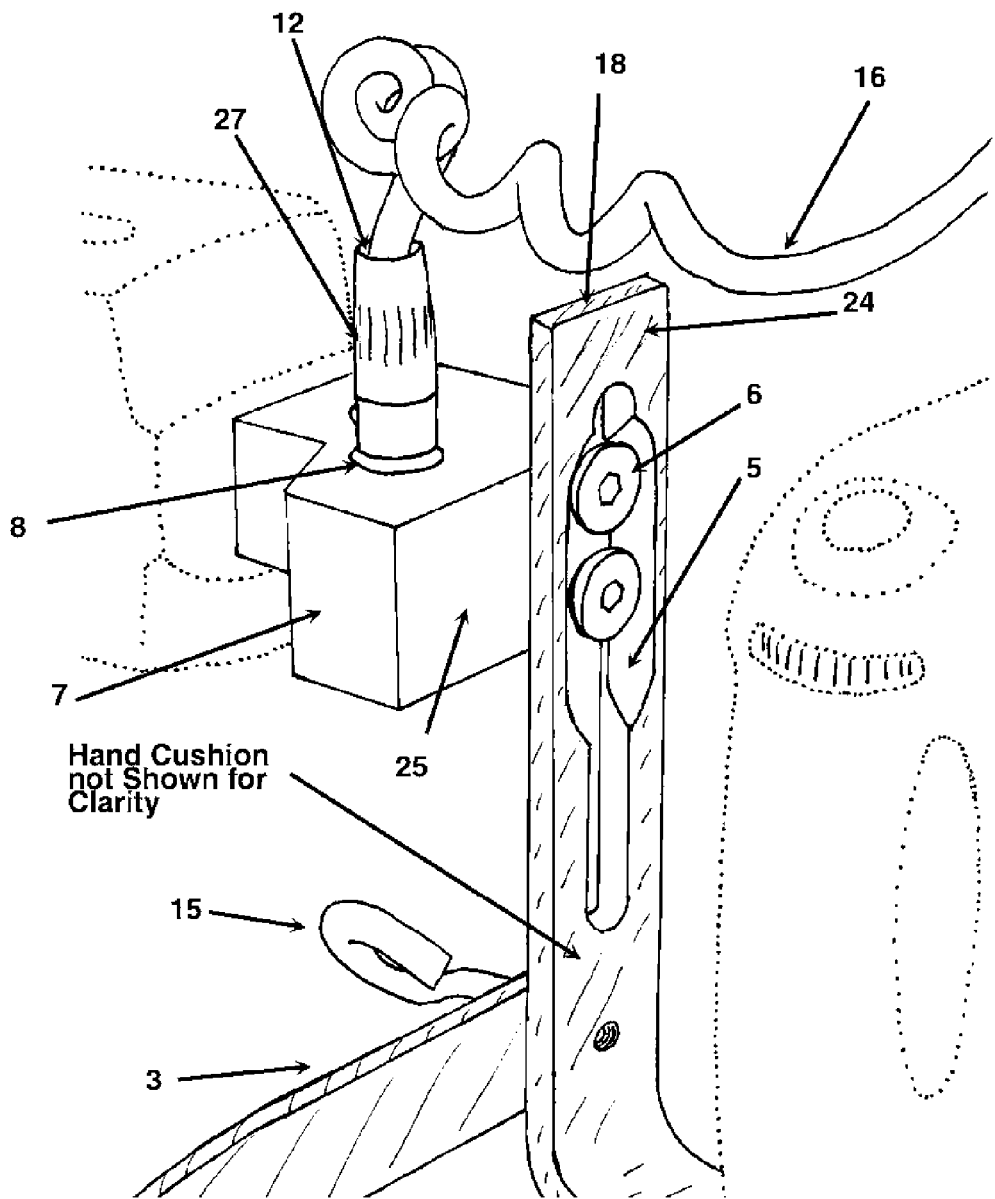
FIG. 3 shows a close-up of the 2nd switching unit and flash attached

Vertical mounting portion 18 is slotably configured as seen in FIG. 3, with slot 5 whose configuration will allow for the illumination device to be centered in the same horizontal plane as the lens of the camera. Mounting devices 6 are allowed to enter though the interior portion 24 of vertical mounting portion 18, protruding a sufficient distance as to allow for threaded interface with illumination device interface module 7, where by the base of illumination device interface module 25 contains internal adaptor means to receive mounting devices 6. In this invention, mounting devices 6 are 10-24 threaded studs with beveled heads, that are flush with the surface of the interior portion 24 when they are completely received by internal adaptor means of base of illumination mounting device interface module 25. Mounting devices 6 must constructed as to be able to resist movement of the illumination mounting device interface module in both a horizontal and vertical plane throughout use by the user. In this invention, stainless steel threaded bolts with beveled heads are used. Other mounting devices that can be used are those that incorporate 10-24 threads or quick disconnecting couplers that have similar movement resisting capabilities.

Figure 4:
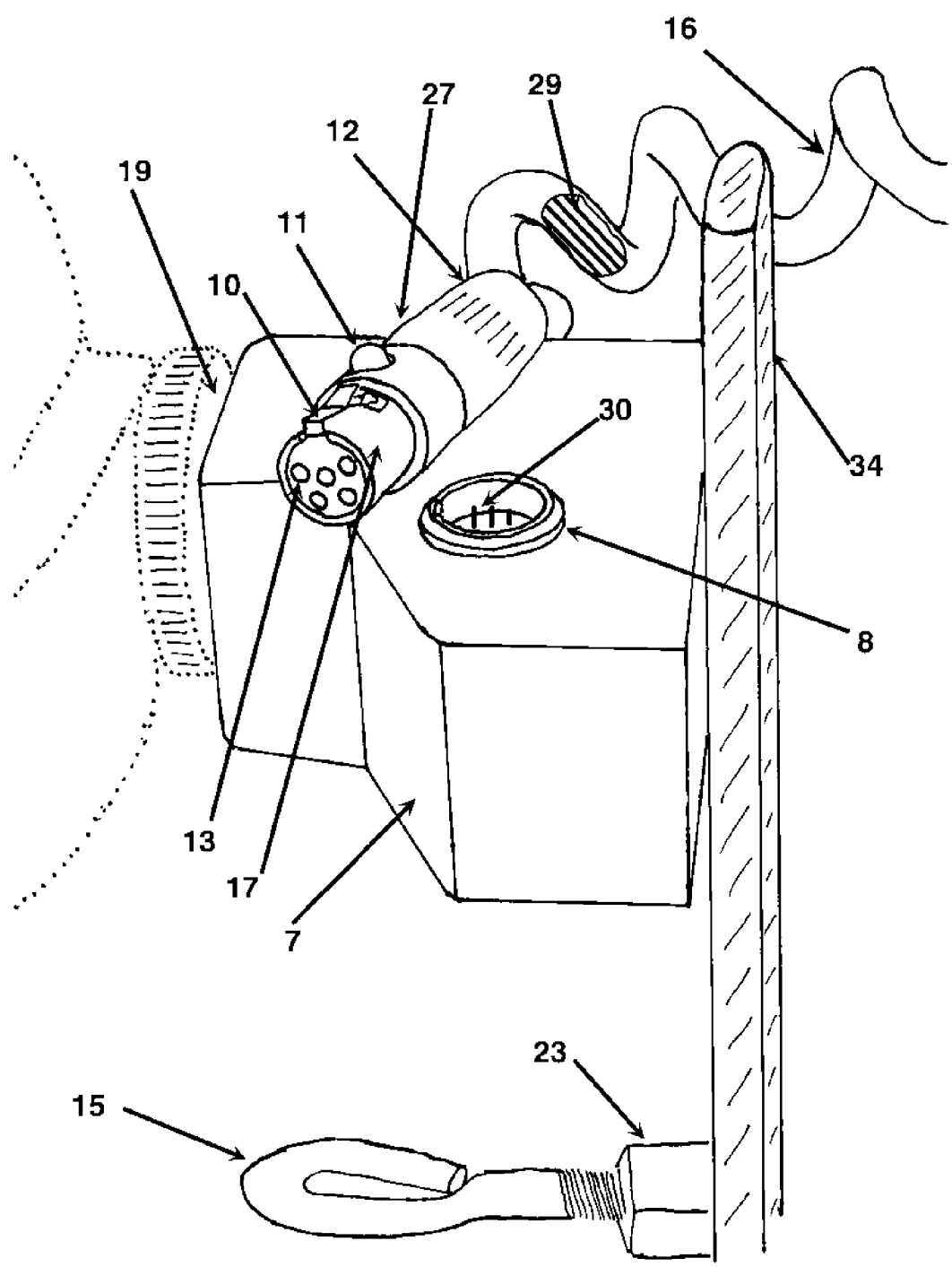
FIG. 4 shows a 2nd switching unit with synchronization cord unattached

FIG. 4 shows illumination device interface module 7 that has male sync cord adaptor 8 positioned on the side of illumination device interface module 7 perpendicular to the base of illumination device interface module 25 with a presentation of the male sync cord adaptor 8 is in such a manner as to facilitate the least path of distance between the illumination device interface module 7 and the main interface module 26. Male sync cord adaptor 8 has the same number of mating pins as are associated and are positioned similarly with the female mating pins 13 located in the exterior end of the sync cord termination housing 27. The sync cord termination housing 27 has a locking clip 10 that provides interference with the male sync cord adaptor 8 so as to prevent accidental disconnection of the male sync cord adaptor 8 and the sync cord termination housing 27. An unlocking detent 11 is attached to sync cord termination housing 27 and to locking clip 11, to allow for positive removal of the sync cord 16 from the illumination device interface module 7. Sync cord 16 has terminations at opposite ends comprising of sync cord termination housing 27. Sync cord 16 enters the interior of the sync cord termination housing 27 through strain relief 12 located at the end opposite of the exterior end of the sync cord termination housing. Strain relief 12 is threadably attached to sync cord termination housing 27 whereby locking the sync cord into place and providing a secure grip on the sync cord 16 preventing strain to the connection between the sync cord wires 29 and female mating pins 13. Sync cord 16 is comprised of a plurality of sync cord wires 29 small enough to provide the least electrical resistance from the main interface module 6 while large enough to handle the amperage of the electrical signals passed to the illumination device interface module 7 from the hot shoe connection of camera 28. The sync cord wires 29 must be supple enough to withstand kinking and twisting and have a thermal conductivity sufficient to withstand soldering. The quantity of sync cord wires 29 will match the number of nodes present on the hotshoe connection of camera 28. The sync cord wires 29 will be encapsulated in a material which has a high dielectric constant and can withstand the normal operating environment of photographic equipment. In this invention, stranded copper wire was used encapsulated in a neoprene jacket. Sync cord wires 29 are connected to the female mating pins 13 using a brazing process.

Female mating pins 13 mate with exterior end of the male mating pins 30 which are located on the interior of the male sync cord adaptor 8. Construction of female mating pins 13 and male mating pins 30 should be sufficient to receive multiple insertions and decouplings and have high electrical conductivity. In this invention copper pins were used. The interior end of the male mating pin 30 is attached to the detached interface coupling 31 through an attachment means. Detached interface coupling 31 consists of two segments; First a plurality of wire 32 with one end of the wire 32 attached to the interior end of the male mating pins 30, then attached to switching means 33, and secondly, node wire 35 which has one end attached to switching means 33 and the opposite end attached to nodes 20 located on the interior side of female hotshoe 19. Wire 32 and node wire 35 are constructed as to provide the least electrical resistance between the mating pins 30 and nodes 20 and also are capable to handle the amperage of the electrical signals passed from the main interface module 26. Wire 32 and node wire 35 must also be able to withstand the attachment means coupling them to the mating pins 30 and the nodes 20. In this invention, copper wires are attached to the mating pins 30 and nodes 20 through a brazing process as the attachment means. Any process that will assure positive contact with low electrical resistance can be used. Female hotshoe 19 is attached to the illumination device interface module 7 on the side opposite of the base of illumination device interface module 25 using mechanical means. In this invention, the female hotshoe 19 is attached to the illumination device interface module 7 using stainless steel screws and locking nuts. Any attachment means that allows for unencumbered access to the hotshoe by the illumination device and which provides a secure mounting which can be subjected to the torque and gravity effects of the illumination device through it rapid co-planar movements.

Figure 2:
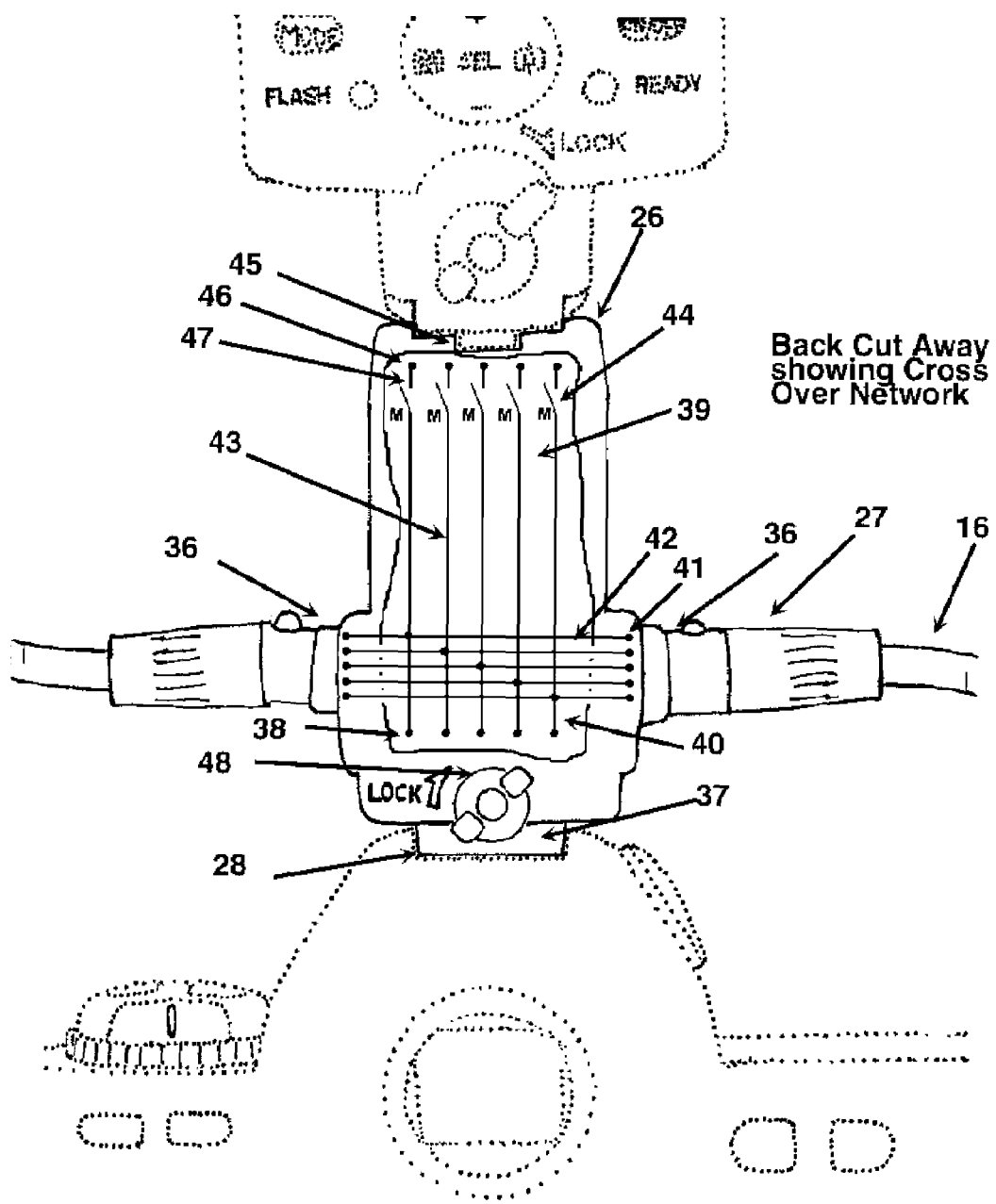
FIG. 2 shows a close-up of the camera's hot shoe showing the hotshoe connection module, switching module and flash attached

FIG. 2 shows the anterior view of the interior of the illumination device interface module 7, which details the detached interface coupling 31. Detached interface coupling 31 consists of a plurality of wires 32, the quantity of which will equal the number of nodes 20 present on the camera hotshoe 28. One end of wire 32 is attached to the interior end of male mating pin 30 and the other to a switching means 33. There is one switching means for each node 20. Switching means 33 is a planar sensitive switch which is open or non-conductive in the horizontal plane and is closed or conductive when it is in the vertical plane. It is critical that the switches operate instantaneously when the apparatus is brought within 20 degrees of planor orientation. In this invention, mercury switches were used. One Leg of the mercury switch was attached to wire 32 and the other leg was attached to node wire 35. Node wire 35 is attached to node 20. The means for attachment and composition of the wires have been previously disclosed.

The end of sync cord 16 which is not connected to male sync cord adaptor 8 is connected to main interface module 26 using main male sync cord adaptor 36. Main male sync cord adaptor 36 is similar in composition and construction as male sync cord adaptor 8 but is located on main interface module 26 in such a location as to allow sync cord 16 to be routed away from interference of the user. In this invention the main male sync cord adaptor is mounted on the right side of the main interface module 26. Another embodiment of this invention has the main male sync cord adaptor 36 mounted on the left side of the main interface module 26.

Another embodiment of this invention has two main male sync cord adaptor 36 mounted on either side of the main interface module as shown in FIG. 2. Sync cord 16 has terminations on each end which consist of strain relief 12 and sync cord termination housing 27, along with a plurality of female pins 13. Main interface module 26 connects to camera hotshoe 28 using main interface module hotshoe 37. An embodiment has the main interface module 26 being locked in place using a cam lock 48, that is standard in the photographic industry. Main interface module hotshoe 37 contains the same number of Main nodes 38 as are contained in camera hotshoe 28. The Main nodes 38 are located on the interior of main interface module hotshoe 37. Main nodes 38 are attached to the main module crossover network 39 using pin connection wire 42. The interior side of the mating pins 41 are attached to the main module crossover network 39 using crossover wire 40. Crossover wire 40 and pin connection wire 42 should have at least similar composition and construction characteristics of wire 32 to facilitate the same electrical connections throughout the apparatus. In this invention, crossover wire 40 and pin connection wire 42 are made of copper. Each crossover wire 40 is joined to the respective pin connection wire 42 and main switch wire 43 using attachment means. Attachment means must facilitate high speed electric connectivity while assuring complete separation between each crossover wire, respective pin connection wire and main switch wire. In this invention, the crossover wire, pin connection wire and main switch wire were brazed and insulated from contact with other such connections. Any means for accomplishing similar results including the use of printed circuit boards can be used and are within the spirit of this invention. The end opposite of the main switch wire 43 not attached to the crossover wire 40 and pin connection wire 42 is attached to main switching means 44. Main switching means 44 is at least similar in composition and construction as switching means 33, in terms of electrical conductivity and planar orientation responses. In this invention mercury switches are used whereby the mercury switch closes or completes the circuit when main interface module 26 is in the vertical orientation and the mercury switches are open when main interface module 26 is in the horizontal plane. The opposite end of the switching means 33 is attached using attaching means to the exit nodes 46 which are located on the interior of main illumination device holder 45 using exit wire 47. This attaching means is similar in composition and construction as the attachment of main switch wire 43 to pin connection 42 and crossover wire 40. In this invention, exit wire 47 is brazed onto exit node 46 and switching means 33. Main illumination device holder 45 is attached to main interface module 26 at the end opposite of the attachment of main interface module hotshoe 37, while maintaining it's linear relationship to the centerline of the camera lens.

While this invention has been described in detail through it's embodiments, it does not limit the scope of this invention to physical or electrical designs. This disclosure not intended to be limited in scope to only those methods herein described as this invention's embodiments are capable of replication through digital or other various electrical means, and this invention's disclosure scope can be accomplished by other methods by those skilled in the art without departing in any way from the spirit of this invention.

What is claimed is:

1. An Automatic Flash Switching Rotational Strobe Apparatus for image retention devices comprising a frame structure, a main command module, ancillary modules, planar orientation sensory means, multi-channel data passthrough, image retention lens protection device, main command module/image retention device interface and luminary image enhancing device interface.

2. An Automatic Flash Switching Rotational Strobe Apparatus for image retention devices as in claim 1 where said frame structure further comprises image retention device interfaces and photographic equipment interfaces.

3. An Automatic Flash Switching Rotational Strobe Apparatus for image retention devices as in claim 1 where said frame structure further comprises the attachment means for said ancillary modules in proper physical relationship to image retention device.

4. An Automatic Flash Switching Rotational Strobe Apparatus for image retention devices as in claim 1 where said main command module is attached to image retention device.

5. An Automatic Flash Switching Rotational Strobe Apparatus for image retention devices as in claim 1 where said main command module comprises conductive crossover circuit capable of directing electrical and data impulses to said ancillary modules and to directly mounted said luminary image enhancing device interface.

6. An Automatic Flash Switching Rotational Strobe Apparatus for image retention devices as in claim 5 comprising 1 said ancillary module and 1 said multi-channel data passthrough connecting said ancillary module to said main command module.

7. An Automatic Flash Switching Rotational Strobe Apparatus for image retention devices as in claim 5 comprising 2 said ancillary modules and 2 said multi-channel data passthrough connecting said ancillary modules to said main command module.

8. An Automatic Flash Switching Rotational Strobe Apparatus for image retention devices as in claim 1 where said planar orientation sensory means comprises devices that can react to bi-planar orientations.

9. An Automatic Flash Switching Rotational Strobe Apparatus for image retention devices as in claim 8 where said planar orientation sensory means comprises devices that allow continuity of digital impulses when means are in the vertical plane.

10. An Automatic Flash Switching Rotational Strobe Apparatus for image retention devices as in claim 8 where said planar orientation sensory means comprises devices that allow discontinuity of digital impulses when means are in the horizontal plane.

11. An Automatic Flash Switching Rotational Strobe Apparatus for image retention devices as in claim 8 where said planar orientation sensory means comprises devices that allow continuity of analog data impulses when means are in the vertical plane.

12. An Automatic Flash Switching Rotational Strobe Apparatus for image retention devices as in claim 8 where said planar orientation sensory means comprises devices that allow discontinuity of analog data impulses when means are in the horizontal plane.

13. An Automatic Flash Switching Rotational Strobe Apparatus for image retention devices as in claim 1 where said multi-channel data passthrough comprises connection means and a plurality of insulated electrical conductors, equal in number to the data outputs of the image retention devices.

14. An Automatic Flash Switching Rotational Strobe Apparatus for image retention devices as in claim 13 where said multi-channel data passthrough connection means comprises positive locking mechanisms, and conductive mating members.

15. An Automatic Flash Switching Rotational Strobe Apparatus for image retention devices as in claim 1 where said main command module/image retention device interface comprises a camera hotshoe adaptor.

16. An Automatic Flash Switching Rotational Strobe Apparatus for image retention devices as in claim 15 where said main command module/image retention device interface comprises a plurality of nodes equal to the number of nodes contained in the image retention device interface.

17. An Automatic Flash Switching Rotational Strobe Apparatus for image retention devices as in claim 1 where said main command module/luminary image enhancing device interface comprises a camera hotshoe.

18. An Automatic Flash Switching Rotational Strobe Apparatus for image retention devices as in claim 1 where said image retention device comprises an analog camera.

19. An Automatic Flash Switching Rotational Strobe Apparatus for image retention devices as in claim 1 where said image retention device comprises a digital camera.

20. An Automatic Flash Switching Rotational Strobe Apparatus for image retention devices as in claim 1 where said luminary image enhancing device interface comprises a photographic camera hotshoe.

21. An Automatic Flash Switching Rotational Strobe Apparatus for image retention devices as in claim 1 where said image retention lens protection device comprises a rigid member whose length is greater than that of the said image retention device lens.

22. An Automatic Flash Switching Rotational Strobe System for image retention devices comprising of a main command module, planar orientation sensory means, and a luminary image enhancing device interface.

23. An Automatic Flash Switching Rotational Strobe System for image retention devices as in claim 22 where said image retention image device is a point and shoot style of camera.

24. An Automatic Flash Switching Rotational Strobe System for image retention devices as in claim 23 where said system is located inside of said camera.

25. An Automatic Flash Switching Rotational Strobe System for image retention devices as in claim 24 where at least 2 of said camera's illumination devices are located internally of said camera.

26. An Automatic Flash Switching Rotational Strobe System for image retention devices as in claim 22 where said main command module electronically interfaces with said camera's shutter operating means and said planar orientation sensory means.

27. An Automatic Flash Switching Rotational Strobe System for image retention devices as in claim 26 where said planar orientation sensory means comprises devices that allow continuity of analog data impulses when means are in the vertical plane.

28. An Automatic Flash Switching Rotational Strobe System for image retention devices as in claim 26 where said planar orientation sensory means comprises devices that allow discontinuity of analog data impulses when means are in the horizontal plane.

29. An Automatic Flash Switching Rotational Strobe System for image retention devices as in claim 26 where said planar orientation sensory means are electronically connected to said command module and said camera's illumination devices.

* * * * *